May 24, 1960  L. G. RANFT ET AL  2,937,563
FADING AND DISSOLVING DEVICE FOR MOTION PICTURE CAMERAS
Filed Oct. 16, 1957  3 Sheets-Sheet 3

United States Patent Office 2,937,563
Patented May 24, 1960

2,937,563

FADING AND DISSOLVING DEVICE FOR MOTION PICTURE CAMERAS

Ludwig G. Ranft and William F. Eibl, Rochester, N.Y., assignors to Wollensak Optical Company, Rochester, N.Y., a corporation of New York Filed Oct. 16, 1957, Ser. No. 690,492

11 Claims. (Cl. 88—16)

This invention relates to a fading and dissolving device for attachment to a motion picture camera, particularly an amateur motion picture camera.

An object of the invention is the provision of a generally improved and more satisfactory device of this kind.

Another object is the provision of a fading and dissolving device which is simple and easy to manufacture, and rugged and durable in construction.

Another object is the provision of a fading and dissolving device which can be easily attached to and detached from the motion picture camera with which it is to be used, in properly oriented position; which can be operated in a simple manner to cause a gradual fade out or fade in; which can be wound easily and quickly; which has a fool-proof control; which has shutter blades for complete extinction of the rays of light; which is extremely uniform in its fading action in a very reliable manner, and which can be used either with or without a filter.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
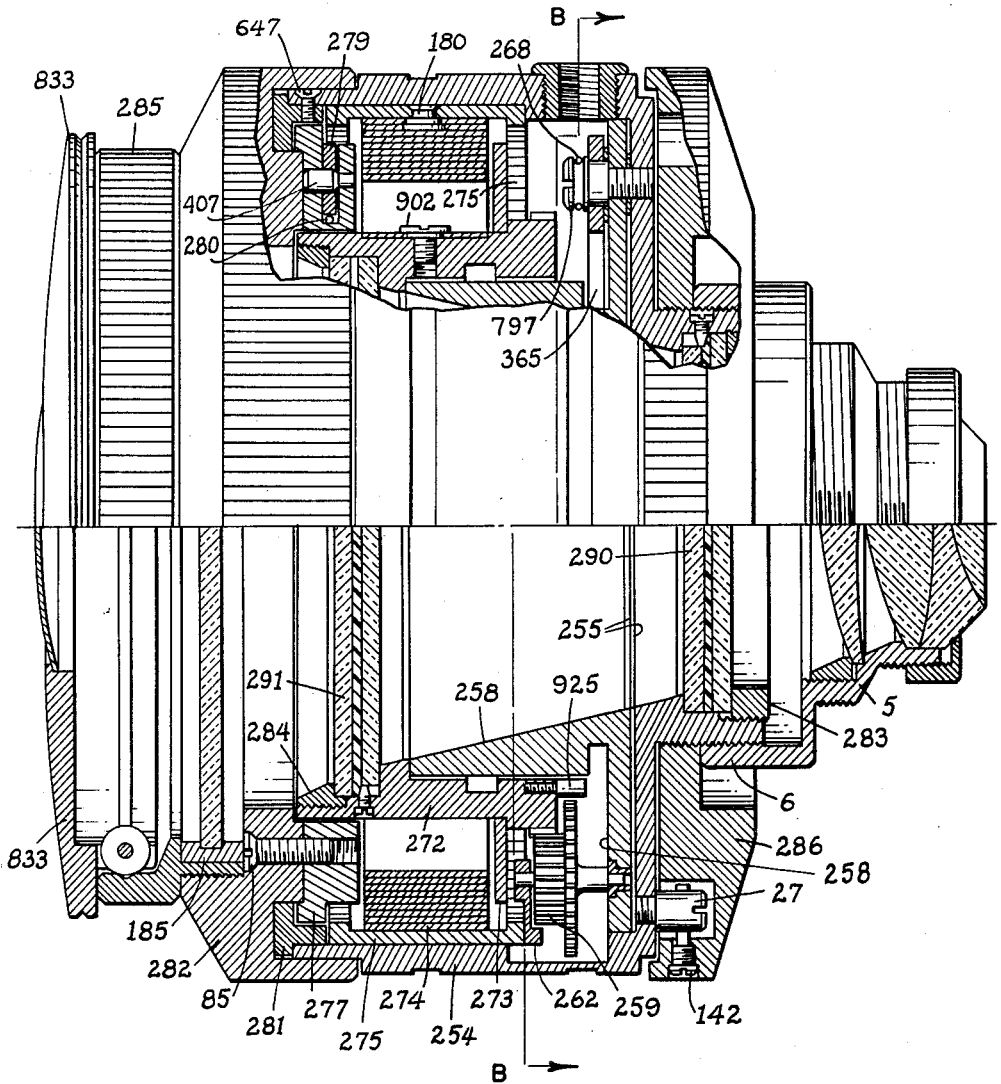
Fig. 1 is a view partly in side elevation and partly in longitudinal or axial section, through a preferred form of fading and dissolving device, showing it applied to a motion picture objective lens, the section being taken approximately on the line A—A of Fig. 2.

The construction is shown by way of example as applied to an objective lens assembly of an amateur motion picture camera, the lens assembly being indicated in general at 5 and having a forwardly extending annular flange 6 at its front end, which is internally threaded.

The device of the present invention comprises a main body 254 of generally annular form, having a rearwardly extending annular flange at its rear end, externally threaded to screw into the screw threads of the flange 6 of the camera lens, as shown. A locking ring 286 is internally threaded to travel on the same threads of the flange just mentioned, so that after the threads of the body 254 have been screwed into the lens mount, the locking ring 286 may be tightened or jammed against the front edge of the lens mount, locking the dissolving device in fixed position on the lens mount. Of course by loosening the locking ring 286, the dissolving device can be turned to orient it in any desired way, for most convenient operation. A pin 27 extends rearwardly from the body 254 into an annular groove in the forward face of the locking ring 286, and a radial pin 142 in the locking ring 286 engages the pin 27 to form a stop limiting the rotation of the ring 286 to slightly less than one complete revolution.

Mounted near the rear end of the stationary body 254 is a first polarizing member 290 extending transversely across the optical axis perpendicular thereto. It is held in place by a retaining ring 283, screwed into internal threads in the same rearward extension of the body which is externally threaded to fit into the lens mount of the camera.

Mounted in stationary position within the outer body 254 is a support plate 258 held therein by suitable screws or bolts and constituting, in effect, part of the stationary body. This support plate is mounted on the rear wall of the main body member 254 and projects forwardly therefrom in the form of an annular flange, the inner face of which is frusto-conical and the outer face of which is cylindrical to form a bearing surface for a rotatable barrel 272 which projects forwardly beyond the front end of the plate 258 and which carries near its front end a second polarizing member 291 held in place by a retaining ring 284 screwed into internal threads at the forward end of the barrel 272. Except for a difference in diameter, the first polarizer member 290 and the second polarizer member 291 may be of similar construction, both being of any well known polarizing material, for example, a sheet of plastic polarizing material mounted between two sheets of glass. The two polarizing members are parallel to each other and perpendicular to the optical axis.

A barrel spring 274 of the same general type as the main spring of a watch, encircles the rotatable barrel 272 and has its inner end fixed to the barrel by means of a radial screw 902 while the outer end of the spring is fixed by a rivet 180 to a spring case member or retainer member 275 which has a snug rotary fit within the inner face of the main body 254. An annular plate 273 lies just to the rear of the spring 274, to retain it against rearward axial displacement.

A winding ring 282 encircles the main body 254 at the front end thereof, and is rotatable thereon. It has a serrated circumference for easy grasping by the fingers of the operator, so that the ring may be turned for winding the spring 274. In order to keep the winding ring in place and prevent it from being displaced axially forwardly relative to the main body 254, the winding ring is secured by screws 85 to a second ring 277 which rotates with the winding ring 282, this ring 277 having a radial shoulder which lies behind (to the rear of) a radial shoulder on the stationary ring 281 which is held in fixed position on the stationary body 254 by a series of radial screws 647 arranged at intervals around the periphery.

The ring 277 (which rotates with the external winding ring 282 as above mentioned) has a pivot pin 407 extending parallel to the optical axis, on which is pivotally mounted a pawl 279 urged by a spring 280 in such direction that the outer end of the pawl 279 engages internal teeth formed on a shallow flange at the front end of the spring case 275. If the external winding ring 282 is grasped by the fingers and turned in a clockwise direction when viewed from the front of the device, the pawl 279 will cause corresponding clockwise rotation of the spring case 275, but the winding ring 282 can turn freely in a counterclockwise direction without corresponding motion of the spring case.

To prevent the spring case 275 from turning backward in a counterclockwise direction when it has been wound, a second pawl 266 is pivoted on a stud 404 and held in place thereon by the head of a screw 8 screwed into the center of the stud 404, this stud being mounted on the stationary body 254 in such position that the end of the pawl 266 will engage internal ratchet teeth formed on the spring case or retainer 275. The direction of this pawl is such as to prevent retrograde or counterclockwise motion of the spring case or retainer 275 (when viewed from the front of the device). Thus by turning the externally accessible winding ring 282, the spring case or retainer can be turned to tighten the spring 274, and it is seen by this pawl arrangement the case may be wound easily by back and forth oscillations through a relatively slight angle, as it is not necessary to turn the winding ring continuously in one direction.

Projecting rearwardly from the rotatable barrel 272 are four pins parallel to the optical axis and at equal radial distances from the optical axis and equal angular distances (90 degrees) from each other. Two of these pins 925 at diametrically opposite points are somewhat longer than the other two pins 924 which are at diametrically opposite points with respect to each other and on a diameter 90 degrees away from the diameter joining the pins 925. All four of the pins, however, are long enough to engage the end of a latch 263 pivoted in the stationary body at 897 and urged by a spring 269 in a counterclockwise direction on its pivot 897 (when viewed from the front as in Fig. 2) so as to tend to bring the lower end of the latch (when viewed as in Fig. 2) into the path of travel of the pins 924 and 925. The spring 269 is wrapped around the pivot 897, with one end of the spring engaging a stud 222 on the latch member 263, and the other end of the same spring cooperates with the pawl 266 to hold it against the ratchet teeth of the spring case or retainer 275.

Figure 2:
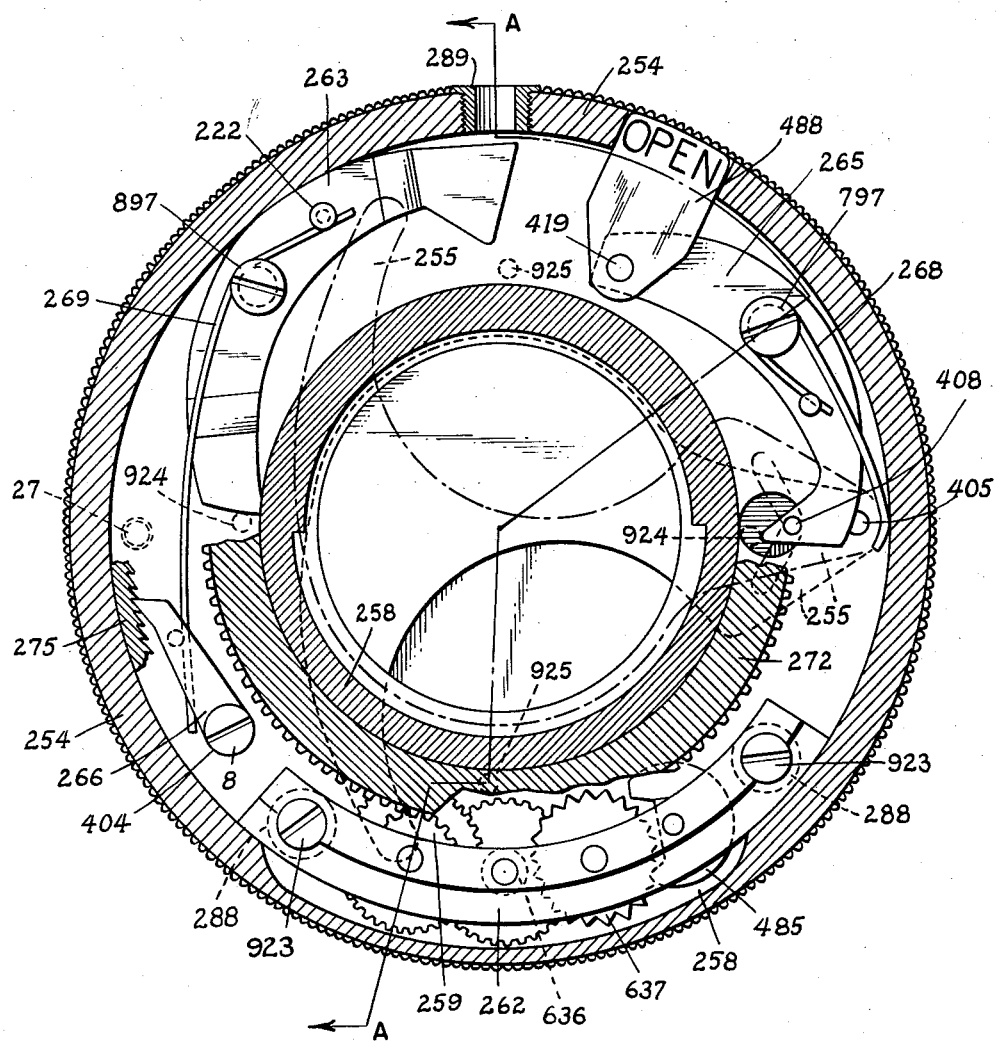
Fig. 2 is a somewhat diagrammatic transverse section through the construction shown in Fig. 1, taken approximately on the line B—B of Fig. 1.

The tail of the latch 263 lies just inside a bushing 289 extending radially through the stationary body 254 in position to receive the end of a cable release member of the kind commonly used with photographic shutters. When the cable release is pressed, the tail of the latch 263 will be moved radially inwardly, so that the nose of the latch will be moved radially outwardly away from the pin 924 or 925 (as the case may be) with which it was in contact, so that the spring 274 may turn the barrel 270 90 degrees about the optical axis as a center, until the next pin 924 or 925 comes around to the nose of the latch lever 263. The operator should release the cable release member promptly after he has depressed it to initiate a rotary operation, but in case the operator forgets to release the latch, no harm is done because the tail of the latch is shaped, as seen at the top of Fig. 2, so that the pin 924 or 925 as it comes around will engage the oblique cam portion on the tail of the latch and stop further rotation of the barrel a little before the next pin 924 or 925 comes to proper position to engage the nose of the latch. At the same time it will tend to cam the latch back to its effective latching position, and one pin cannot slip past the tail of the latch until the nose of the latch is in position to engage and stop the next succeeding pin. Thus the operation is foolproof and the barrel cannot accidentally be allowed to turn through more than 90 degrees at one time.

Figure 3:
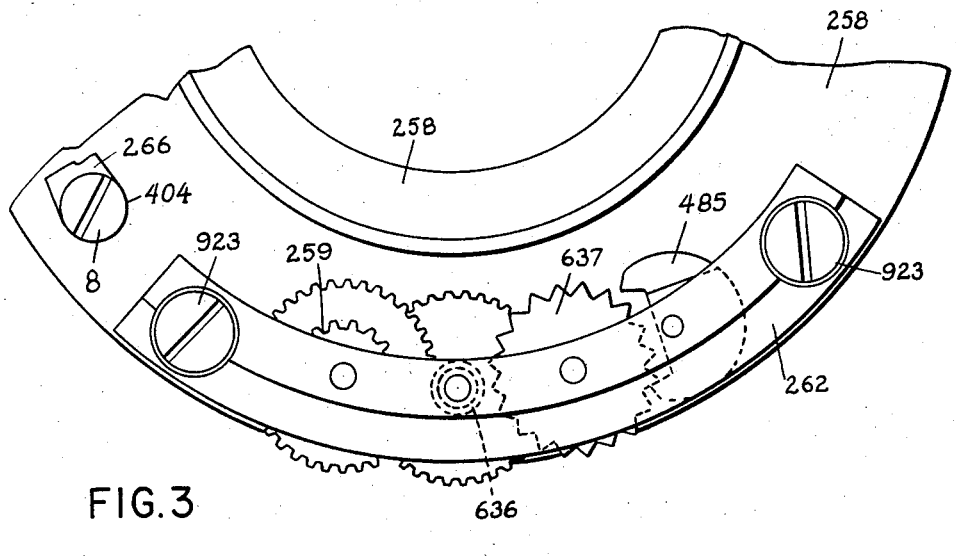
Fig. 3 is a plan of the retarding mechanism on a larger scale.
Figure 4:
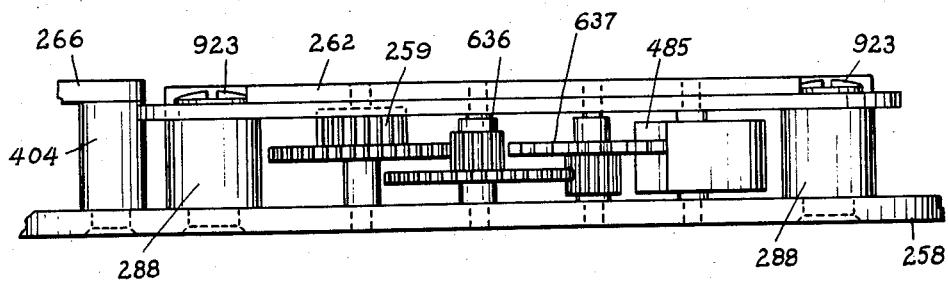
Fig. 4 is an edge view of the retarding mechanism.

When either one of the two shorter pins 925 is engaged with the nose of the latch 263, the rotary polarizer 291 is oriented in such position with respect to the stationary polarizer 290 that the planes of polarization of these two polarizers are parallel to each other, and there is maximum transmission of light along the optical axis. When the barrel is turned through 90 degrees from such position, so that either one of the longer pins 924 is engaged with the nose of the latch 263, then the plane of polarization of the rotary polarizer 291 is at right angles to the plane of polarization of the polarizer 290, and there is minimum transmission of light along the optical axis. In order to retard the rotation of the barrel and the rotary polarizer from one position to the next position, a gear train retarder is incorporated in the device, which is partly shown in Figs. 1 and 2 and better shown in Figs. 3 and 4.

The barrel 272 near its rear edge has external gear teeth which mesh with teeth of a pinion 259 fixed to a gear which meshes with a pinion 636 which carries a second gear meshing with a pinion secured to a star wheel or escapement wheel 637 cooperating with a vibrating anchor or pallet 485. The respective shafts of the gears and of the anchor or pallet are journaled at their rear ends in a flange of the stationary member 258, and at their front ends in an overlying plate 262 held in stationary position on the member 258 by screws 923 threaded into posts 288 riveted to the member 258. Any turning of the barrel 272 within the stationary body must proceed only at the rate allowed by operation of the clockwork escapement, which accurately times the turning motion to a uniform rate so as to require preferably about 3½ seconds for each 90 degree turn from open to closed position or vice versa.

In the theoretically closed position, when the two polarizers have their polarizing axes at 90 degrees to each other, there is still some very slight transmission of light, although it is obstructed to about 98 percent. To produce complete obstruction or extinction of all light, the device is provided with a pair of extinction shutter blades 255, of the shapes best shown in Fig. 2, both pivoted on a common stationary pivot 405 on the stationary body 254. Both blades have oblique operating slots as shown, receiving a pin 408 on a blade operating lever 265 pivoted on the stationary pivot 797 and constantly urged by a spring 268 tending to turn the lever in a clockwise direction to move the pin 408 radially inwardly toward the optical axis, to hold the shutter blades 255 in fully open position.

The short pins 925 are not long enough to reach the plane of the blade operating lever 265. However, the long pins 924 are a little longer so that as they come around to the vicinity of the lever 265 during rotation of the barrel, either one of the long pins will engage an oblique cam surface near the trailing end of the blade operating lever 265, as well seen in Fig. 2, and will cam the trailing end of the lever in a radially outward direction against the force of the spring 268, thereby moving the pin 408 radially outwardly away from the optical axis, and bringing both of the blades 255 to their fully closed position. When the rotation of the barrel stops with one of the long pins 924 resting against the nose of the latching lever 263, the other one of the long pins is directly opposite the trailing end of the blade lever 265 as seen in Fig. 2, and the blades are kept closed, thus extinguishing all light transmission through the device. As soon as the latch 263 is released to start the next rotation, the pin 924 immediately slips off of the end of the lever 265 and the spring immediately shifts the lever 265 to open both of the blades fully. Then as rotation gradually continues, the orientation of the two polarizers relative to each other is altered so that a gradual fade-in occurs.

At the same time that the blade lever 265 is moved clockwise by the spring 268 to open the shutter blades, the opposite or leading end of the same lever causes radial outward projection of a visual indicator 488 pivoted to the lever at 419 and extending into a small radial slot in the stationary body 254. The visual indicator 488 carries a sutiable notation such as the word "Open" which can be read when it is projected radially outwardly when the shutter blades are open. When the long pin 924 comes around to the trailing end of the shutter blade lever 265 and closes the shutter blades, this retracts the visual indicator 488 to the position shown in Fig. 2, so that it is not visible externally of the device, and the operator thus knows that the blades are closed and that the device is in non-light-transmitting condition.

The front end of the winding ring 282 is provided with an internal screw thread, into which may be screwed the external thread on the rear end of a filter holder 285 containing a filter 185 of any desired kind. The filter holder may be easily unscrewed and replaced by another filter holder with a different filter. Thus the operator is able to use any desired filter with this fading and dissolving attachment.

The front end of the filter holder 285 may be closed, when the device is not in use, by a dust cap or cover 833 which may conveniently be of the same construction shown in Van Horn Patent 2,769,364, granted November 6, 1956.

In use, the device of the present invention may be screwed into the front of the lens mount of the motion picture camera and left in place permanently thereon if desired, or may be placed on just before a fading or dissolving sequence is to be shot, and then removed later. When a fade-out is desired, assuming that the shutter blades are open and the polarizers are in position for maximum light transmission, the cable release is pressed to move the latch 263, whereupon the barrel 272 rotates under the influence of the spring 274, at a rate controlled by the clockwork retarding mechanism, rotating approximately 90 degrees in 3½ seconds, to cause a gradual fade-out or gradual lessening of light transmission until complete extinction is achieved. If a fade-in is desired, to start the next scene, the cable release is again actuated, and the barrel will rotate another 90 degrees, to increase the light transmission gradually from complete extinction to maximum transmission. If a dissolve is desired, dissolving one scene into the next without a complete fade-out followed by a complete fade-in, then at the completion of the fade-out, the camera is stopped, the film is rewound a short distance, and is then operated just as in the case of a fade-in, so that during the subsequent projection of the finished picture, one scene will dissolve into the next one.

The invention has thus achieved, in the form of a simple and relatively inexpensive device, an attachment which can easily be placed on an amateur motion picture camera, to enable an amateur picture taker to give a very professional touch to his pictures, similar to that which is achieved by the expensive built-in fading and dissolving structures incorporated in high priced professional motion picture cameras.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A fading and dissolving device for attachment to a motion picture camera of the type having a lens mount equipped with an internal thread at its forward end, said device comprising a stationary body having at its rear end an externally threaded flange to be screwed into said internal thread of said lens mount, a lock ring internally threaded to travel on said externally threaded flange to be tightened against the forward end of said lens mount to hold said body in fixed position on said lens mount, a first polarizing sheet mounted in fixed position in said body, an annular barrel rotatably mounted in said body, a second polarizing sheet mounted in said barrel to rotate bodily therewith successively to positions in which the respective planes of polarization of the two sheets are parallel to each other and alternate positions in which they are at right angles to each other, a barrel spring surrounding said barrel and tending to turn said barrel successively through said positions, a manually releasable latch within said body for holding said barrel in selected ones of said successive positions against the force of said spring tending to turn the barrel, gear retarding means including a gear train having a first end geared to said barrel to be driven by rotation of said barrel and having a second end including an escapement wheel and a vibrating anchor in engagement therewith, said retarding means controlling the speed of rotation of said barrel from one position to the next successive position when said latch is released, a plurality of extinction shutter blades mounted within said body for movement between open and closed positions, a shutter spring tending to move said blades to open position, and means operated by movement of said barrel for closing said shutter blades against the force of said shutter spring as said barrel moves to each of its said alternate positions in which said two planes of polarization are at right angles to each other.

2. A construction as defined in claim 1, further including a visual indicator having a part moveable approximately radially with respect to said body between a projecting and externally visible position and a withdrawn position substantially invisible externally, and means positioning said indicator part in said projecting position when said two polarizing sheets have their planes of polarization substantially parallel and in said withdrawn position when said sheets have their planes of polarization substantially at right angles to each other.

3. A construction as defined in claim 1, further including a visual indicator having a part movable approximately radially with respect to said body between a projecting and externally visible position and a withdrawn position substantially invisible externally, and means coupling said indicator to said extinction shutter blades to position said indicator part in said projecting position when said blades are in open position and to position said indicator part in said withdrawn position when said blades are in closed position.

4. A construction as defined in claim 1, further including a spring retainer rotatably mounted in said body, one end of said barrel spring being operatively connected to said retainer and the opposite end of said barrel spring being operatively connected to said barrel, a winding ring encircling said body and externally accessible for manual grasping, ratchet means operatively interposed between said winding ring and said retainer for turning said retainer in a spring winding direction when said winding ring is turned in one direction, and ratchet means operatively interposed between said retainer and said body for holding said retainer in wound condition when winding force on said winding ring is released.

5. A construction as defined in claim 1, further including a filter holder, means for mounting said holder detachably on said body, and a filter held by said holder in optical alinement with said first polarizing sheet and said second polarizing sheet.

6. A fading and dissolving device for attachment to a motion picture camera, comprising a casing having an optical passageway extending therethrough, a carrier rotatable in said casing, a first polarizing element mounted in stationary position in said casing, a second polarizing element mounted in said carrier to rotate therewith, rotation of said carrier serving to turn said second polarizing element from a position relative to said first polarizing element which allows maximum transmission of light along said passageway to a position substantially obstructing passage of light along said passageway, shutter blade means mounted in said casing for movement from an open position to a closed position completely obstructing passage of light along said passageway, and means controlled by rotation of said carrier for holding said shutter blade means in closed position while said carrier and said second polarizing element are in light obstruction position.

7. A construction as defined in claim 6, further including spring means tending to turn said carrier, manually releasable latch means for holding said carrier in selected positions, and a winding ring encircling said casing and externally accessible for manual grasping, for winding said spring means.

8. A construction as defined in claim 6, further including spring means tending to turn said carrier, manually releasable latch means for holding said carrier in selected positions, and gear train retarding means operatively connected to said carrier to control the rate of turning of said carrier under the influence of said spring means.

9. A construction as defined in claim 6, further including spring means tending to turn said carrier, manually releasable latch means for holding said carrier in selected positions, a visual indicator mounted in said casing for movement in an approximately radial direction from an invisible position retracted within said casing to a visible position projecting outside of said casing, and means controlled by rotation of said carrier for moving said indicator from one of its positions to the other.

10. A fading and dissolving device for attachment to a motion picture camera, comprising a stationary body of generally annular form having an optical passageway extending through said body and adapted to be alined with the optical axis of the camera, two light polarizing elements mounted within said body in position extending across said passageway, said elements being mounted for relative rotation about the optical axis as a center from a maximum light transmitting position to a minimum light transmitting position substantially completely obstructing passage of light along said passageway, spring means tending to cause relative rotation of said elements successively through said maximum and minimum positions, releasable latch means for holding said elements stationary in each successive position, gear train retarding means for controlling the speed of relative movement from one position to the next position when said latch means is released, extinction shutter blade means movable between open and closed positions, and means operative when the polarizing elements are in said minimum light transmitting position for moving said shutter blade means to closed position.

11. A fading and dissolving device for attachment to a motion picture camera, comprising a stationary body of generally annular form having an optical pasasgeway extending through said body and adapted to be alined with the optical axis of the camera, two light polarizing elements mounted within said body in position extending across said passageway, said elements being mounted for relative rotation about the optical axis as a center from a maximum light transmitting position to a minimum light transmitting position substantially completely obstructing passage of light along said passageway, spring means tending to cause relative rotation of said elements successively through said maximum and minimum positions, releasable latch means for holding said elements stationary in each successive position, shutter blade means mounted in said body for movement between a light transmitting position and a light obstructing position, second spring means tending to move said shutter blade means to light transmitting position, and means for moving said shutter blade means to light obstructing position against the force of said second spring means, when said polarizing elements in their relative movements reach substantially their said minimum positions.

References Cited in the file of this patent

UNITED STATES PATENTS

| | | |
|---|---|---|
| 1,468,091 | Thalhammer | Sept. 18, 1923 |
| 2,217,718 | Ulano | Oct. 15, 1940 |
| 2,422,815 | Baia | June 24, 1947 |